United States Patent [19]

Marsh et al.

[11] Patent Number: 5,160,276

[45] Date of Patent: Nov. 3, 1992

[54] MODULAR COMMUNICATION INTERCONNECTION SYSTEM

[75] Inventors: John K. Marsh, Rome City; V. Richard Welch, Fort Wayne, both of Ind.

[73] Assignee: Group Dekko International, Kendallville, Ind.

[21] Appl. No.: 727,481

[22] Filed: Jul. 9, 1991

[51] Int. Cl.$^5$ .............. H01R 11/00; H01R 9/09
[52] U.S. Cl. ..................... 439/502; 439/65; 439/638
[58] Field of Search ............ 439/65, 76, 502, 638, 439/654, 660, 668, 675, 709, 712

[56] References Cited

U.S. PATENT DOCUMENTS

| | | | |
|---|---|---|---|
| Re. 31,733 | 11/1984 | Haworth et al. | 339/4 |
| 1,718,252 | 6/1929 | Putnam | 52/200 |
| 2,845,605 | 7/1958 | Gorman et al. | 339/151 |
| 3,248,576 | 4/1966 | Russell | 307/147 |
| 3,715,627 | 2/1973 | D'Ausilio | 339/23 |
| 3,984,622 | 10/1976 | Ross | 339/148 |
| 3,990,763 | 11/1976 | Kress | 339/155 R |
| 4,060,294 | 11/1977 | Haworth et al. | 339/4 |
| 4,070,548 | 1/1978 | Kasper | 339/154 A |
| 4,135,775 | 1/1979 | Driscoll | 339/22 R |
| 4,227,764 | 10/1980 | Fiske | 339/121 |
| 4,239,320 | 12/1980 | Hesse et al. | 339/154 A |
| 4,253,087 | 2/1981 | Saal | 340/147 R |
| 4,290,664 | 9/1981 | Davis et al. | 439/638 |
| 4,370,008 | 1/1983 | Haworth et al. | 339/4 |
| 4,392,701 | 7/1983 | Weidler | 339/17 R |
| 4,408,819 | 10/1983 | Guelden | 339/154 A |
| 4,523,191 | 6/1985 | Cretin et al. | 340/825.52 |
| 4,577,191 | 3/1986 | Pargee, Jr. | 340/825.52 |
| 4,603,320 | 7/1986 | Jarago | 439/65 |
| 4,626,846 | 12/1986 | Parker et al. | 340/825.52 |
| 4,662,701 | 5/1987 | Lane | 339/176 M |
| 4,753,606 | 6/1988 | DeLuca et al. | 439/719 |
| 4,954,101 | 9/1990 | Nelson | 439/502 |

Primary Examiner—Paula A. Bradley
Attorney, Agent, or Firm—Barnes & Thornburg

[57] ABSTRACT

A wiring arrangement for providing communication channels to a plurality of workstations includes multiple communication connector having respectively n terminals at each of the plurality of workstations. A plurality of modular wiring assemblies are serially arranged between the workstations. Each wiring assembly comprises first and second connectors, each having m terminals, connected by wires in permutated fashion such that the $m^{th}$ terminal of the first connector is connected to the $m^{th}+i$ terminal of the second connector, where i is a positive or negative integer. The first connector of each assembly matingly engages the second connector of an adjacent assembly at each workstation. Terminals of the communication connectors are connected to selected terminals of the first and second connectors so as to provide voice and data communications to each workstation. The permutation allows for provision of voice and data communication channels at each workstation using fewer interconnecting wires than would otherwise be required. Permutation may also be effected by interconnection modules positioned between the connectors of adjacent, serially arranged wiring assemblies having identically wired connector pairs.

18 Claims, 5 Drawing Sheets

MODULAR COMMUNICATION INTERCONNECTION SYSTEM

BACKGROUND AND SUMMARY OF THE INVENTION

The present invention relates to a modular wiring arrangement for supplying communication channels to workstations or cubicles. More particularly, the invention relates to modular wiring assemblies which can be interconnected to supply both voice and data channels to individual workstations from a communication distribution center.

Providing communication facilities to individual workstations in offices requires a significant amount of electrical wiring. In typical workstation wiring arrangements, each workstation is individually field wired to telephone or computer lines, with separate lines extending directly from an input/output line of a communication distribution center to a communication connector at each of the workstations. If standard four terminal telephones are installed at each workstation, this traditional type of wiring arrangement requires four electrical wires running from each work station to the communication distribution center. A like number of wires may also be required for data communication. Maintaining, replacing, or adding new workstations having appropriate communication connectors requires a substantial investment in time and materials using the traditional wiring arrangement.

One method of simplifying office wiring by consolidating wiring connection sites is described in U.S. Pat. No. 4,662,701. A ribbon connector having two rows of 25 contact terminals is connected to twenty-five pairs of incoming telephone wire. Individual telephone lines are connected to outlet plugs which mate with the ribbon connector. Phone channels can be switched, removed or added by repositioning the outlet plugs contacting the ribbon connector. However, this type of wiring arrangement still requires that individual telephone wires be run from each workstation to the ribbon connector.

The present invention provides a wiring arrangement for distributing communication channels to a plurality of workstations. The workstations are electrically connected to a communication distribution center by a plurality of modular assemblies, each modular assembly comprising paired first and second connectors. Each of the first and second connectors have m connection terminals. The m connection terminals of the first and second connectors are electrically connected to each other via electrically conductive wires. Between each first and second connector, the connection order between respective m connection terminals is permutated by connecting the $m^{th}$ terminal of the first connector to the $m^{th}+i$ terminal of the second connector, where i is a positive or negative integer. In addition, each first and second connector is provided with one or more adjoining n-terminal communication connectors for connecting phones or computers at individual workstations to incoming/outgoing data or voice communication channels. Each of the n terminals of each communication connector is connected to an $m^{th}$ terminal of the first or second connectors, allowing each of the plurality of workstations to be addressed from the central communication distribution center.

In operation, the plurality of modular assemblies are serially arranged to link together the workstations and the central communication distribution center. The first connector and $m^{th}$ terminal of a first modular assembly matingly engages the second connector and corresponding $m^{th}$ terminal of an adjacent modular assembly. Similarly, the second connector and $m^{th}$ terminal of the first modular assembly matingly engages the first connector and corresponding $m^{th}$ terminal of another adjacent modular assembly. As a result, a serial "chain" is formed, providing a first connector and second connector, with associated communication connectors for input/output of voice and data communications at each workstation. At one end, the "chain" is connected to a data communications bus, while the other end is connected to a voice communications bus. The permutated connection scheme allows for a more efficient utilization of conductors, such that the plurality of workstations located along the chain are electrically connected to both buses with fewer wires than would otherwise be employed.

In preferred embodiments, the present invention provides a predefined number of workstations N with wiring connections for data and phone input/output. In these embodiments, data connectors are associated with the first connectors while phone connectors are associated with the second connectors. At least N number of first connectors are provided, one for each workstation, with each first connector having m terminals. At least N number of data connectors are also provided, with each data connector having a plurality of electrical connectors that provide a single data channel. At least N number of second connectors are provided, with each second connector having m terminals. At least N number of phone connectors are provided, with each phone connector having a plurality of electrical connectors to provide a phone channel for input/output of voice communications. The $m^{th}$ terminals of each first connector are connected to the m terminals of a respective second connector by a plurality (m) of wires to form a modular cable assembly. In this preferred embodiment, the order of the connections are permutated to link the $m^{th}$ terminal of the first connector to the $m^{th}+4$ terminal of the second connector. The n terminals of the data and phone connectors are connected to respective $m^{th}$ terminals of the first and second connectors so as to provide access to a data and voice communication channel at each workstation.

In other preferred embodiments, a wiring arrangement for distributing communication channels to a plurality of workstations includes multiple communication connectors having respectively n terminals at each of the plurality of workstations and a plurality of paired first and second connectors having respectively m terminals, with the $m^{th}$ terminal of the first connector linked to the $m^{th}$ terminal of the second connector. Each of the first connectors is electrically connected to an adjacent second connector by an interconnection module. Each interconnection module connects the $m^{th}$ connection terminal of a first connector to the $m^{th}+i$ terminal of an adjacent second connector, and further connects each of the n terminals of the multiple communication connectors to terminals of one of the first or second connectors to allow each of the plurality of workstations to be addressed through the multiple communication connectors. The interconnection modules may take the form of printed circuit boards adapted for electrical connection to the first and second connectors.

Communication distribution wiring arrangements of the present invention advantageously link workstations having two or more data or phone channels to communication distribution centers with less wiring than required for "non-permutated" wiring arrangements. Fewer wires are required because on the "data end" of the wiring arrangement most of the wiring is used for data communication, while on the "phone end" most of the wiring is used for voice communication. For example, directly wiring each of 11 workstations with telephone and computer data channels would normally require a total of 88 separate wires (11 workstations multiplied by 2 communication channels multiplied by 4 wires for each communication channel). The wiring arrangement of the present invention requires only 48 wires to supply 11 workstations with the same communication capabilities.

Advantageously, each modular assembly of paired first and second connectors, their interconnecting wires, and their associated data or voice communication connectors are identical to allow for interchangeability of the assemblies. This provides for efficient interconnection of workstations, reduces production and installation costs, and allows installers of the system to easily reconfigure, add, or subtract voice and data channels to any number of workstations.

Other advantages and novel features of the present invention will become apparent from the following detailed description of the invention when considered in conjunction with the accompanying drawings.

DETAILED DESCRIPTION OF THE DRAWINGS

Figure 1:
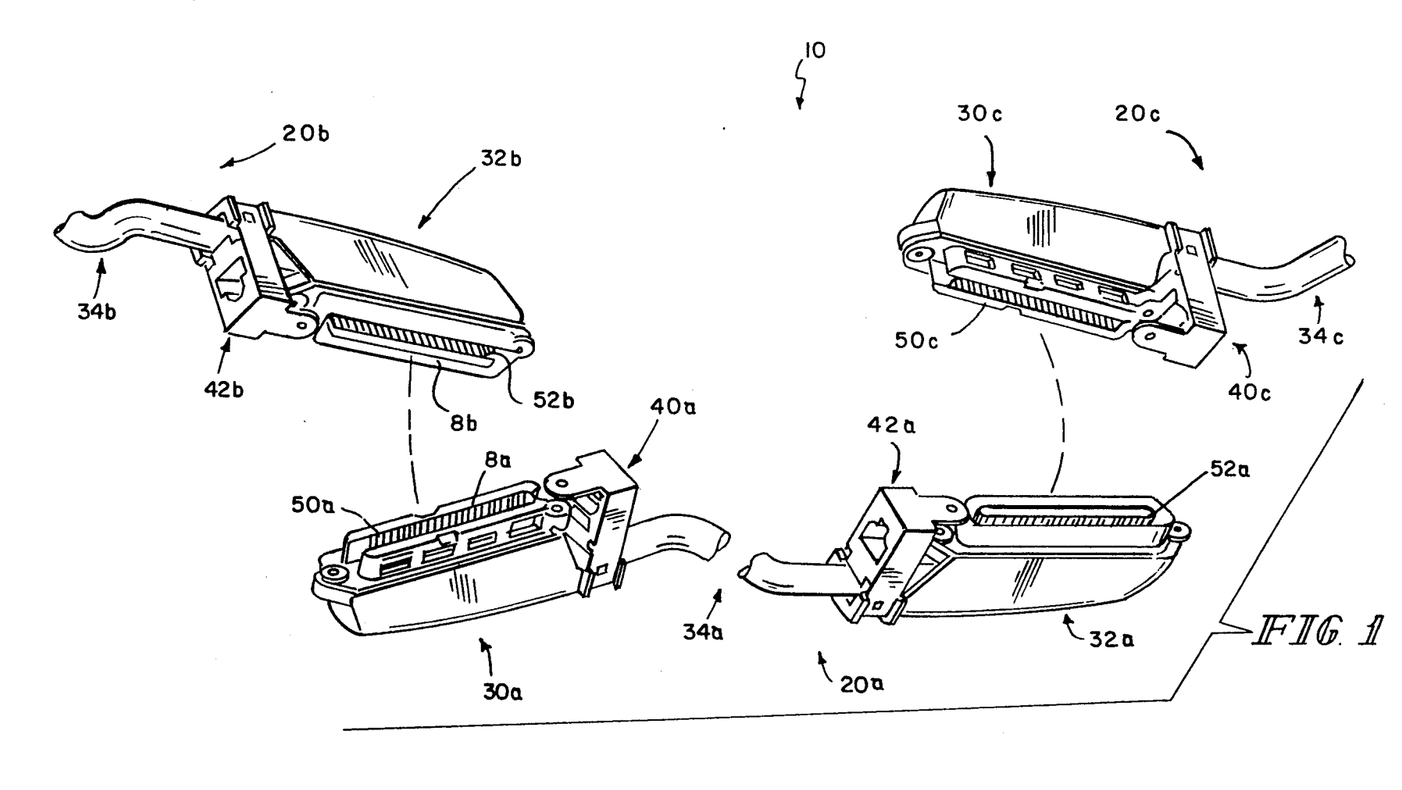
FIG. 1 is a perspective view of a modular communication assembly having paired first and second connectors ready to be connected to two other identical modular communication assemblies (partially shown).

FIG. 1 shows a wiring arrangement 10 which includes multiple modular communication assemblies 20a, 20b, and 20c (assemblies 20b and 20c are partially shown). Since assemblies 20a, 20b, and 20c are identically configured and interchangeable, it is intended that the following description of assembly 20a applies equally to assemblies 20b and 20c, and to their individual components designated in part by a number corresponding to the number of the component in assembly 20a. Wiring arrangement 10 is suited for use in conjunction with electrified modular cubicles, wall panels, workstations, or room dividers having raceways or other areas in which arrangement 10 can be situated, such as is described in U.S. Pat. No. 4,135,775. To the extent necessary for a full understanding of the present invention, the disclosure of that patent is hereby incorporated by reference.

Assembly 20a includes a first connector 30a and a second connector 32a electrically connected by a plurality of wires bundled together as cable 34a. Positioned adjacent first connector 30a is a data connector 40a that connects to a four terminal input/output data channel. Positioned adjacent second connector 32a phone connector 42a that connects to a standard four terminal input/output phone channel capable of carrying incoming and/or outgoing voice communication. Both data connector 40a and phone connector 42a are conventional four terminal receptacles which can receive telephone or data terminal equipment connectors (not shown).

First connector 30a is formed from insulating plastic and has an array of fifty electrically conductive terminals 50a. Terminals 50a are separated into two opposing rows of twenty-five terminals each, and positioned to contact fifty electrically conductive terminals 52b of second connector 32b when connectors 30a and 32b are matingly engaged. Each of the fifty terminals 50a, 50c and 52a, 52b present respectively on first connectors 30a, 30c and second connectors 32a, 32b can be arbitrarily numbered with an integer m. When first connector 30a is joined to second connector 32b, the $m^{th}$ terminal on first connector 30a is positioned in electrical contact with the $m^{th}$ terminal of second connector 32b. Similarly, when second connector 32a is joined to first connector 30c, the $m^{th}$ terminal on first connector 30c is positioned in electrical contact with the $m^{th}$ terminal of second connector 32a. This means, for example, that terminal number 8a (m=8) of first connector 30a mates in electrical contact with corresponding terminal 8b (m=8) of second connector 32b.

Voice and data connectors 40a and 42a are electrically connected to a subset of respective terminals 50a and 52a. Generally, contact terminals of data connector 40a are electrically connected to the $m^{th}$, $m^{th}+1$, $m^{th}+2$, and $m^{th}+3$ terminals 50a. Similarly, contact terminals of phone connector 42a are electrically connected to the $m^{th}$, $m^{th}+1$, $m^{th}+2$, and $m^{th}+3$ terminals 52a.

Terminals 50a and 52a are electrically connected to each other by wires bundled together as cable 34a (broken to indicate arbitrary length) extending between the two sets of terminals. (Individual wires and other cable types may also be used.) However, the wires of cable 34a (and comparable cables 34b and 34c) first and second connectors 30a and 32a is not one-to-one. Instead, each $m^{th}$ terminal of first connector 30a is connected to the $m^{th}+4$ terminal of second connector 32a. This aspect of wiring arrangement 10 is better understood with reference to FIG. 2, which shows representative connections between eleven modular assemblies.

Figure 2:
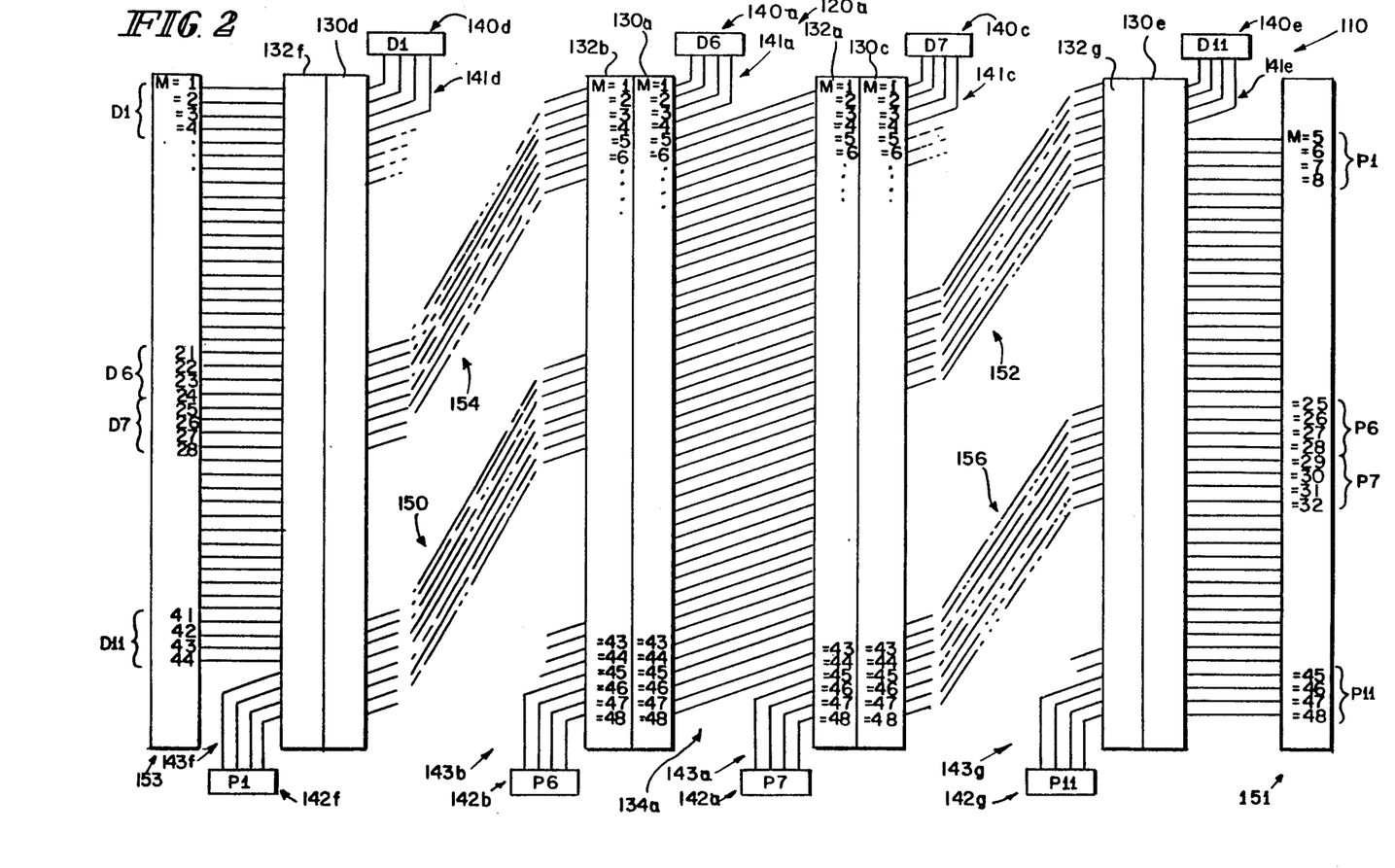
FIG. 2 is a diagrammatic view of a wiring arrangement for eleven workstations utilizing the modular communication assemblies of FIG. 1.

FIG. 2 schematically illustrates a wiring arrangement 110 capable of providing eleven workstations (not shown) with four-wire data and voice communication lines. The addition of the prefix "1" to corresponding numbers of components shown in FIG. 1 is intended to connote equivalence between components respectively illustrated in FIGS. 1 and 2. For example, the box outline labelled 130a in FIG. 2 corresponds to first connector 30a of FIG. 1, the box outline labelled 132a corresponds to second connector 32a, and so on for components 130c, 134a, etc.

Wiring arrangement 110 provides four-pin data communication channels ($D_1$ through $D_{11}$) and four-pin phone communication channels (P1 through P11) to each of eleven workstations (not shown). Lines 150, 152, 154, and 156 are broken to indicate the presence of additional modules not shown in the figure. However, as will be appreciated from the following description, those intervening modules have a configuration identical to that shown for modular assembly 120a.

As shown in FIG. 2, terminals m are numbered in first and second connectors 130a and 132a so that m increases from the top to the bottom of the connectors. This numbering scheme is arbitrary as consistency is maintained for all connectors. Data is input/output from each workstation through data connectors 140a (D6), 140c (D7), 140d (D1), 140e (D11), and the remaining data connectors D2-D5, D8-D10 (not shown). Connecting wires 141a, 141c, 141d, and 141e extend from their respective data connectors to the m=1, 2, 3, and 4 terminals of first connectors 130a, 130c, 130d, and 130e, respectively. These terminals are respectively electrically connected to the corresponding m=1, 2, 3, and 4 terminals of second connectors 132b, 132a, 132f, and 132g. Between first connector 130a and second connector 132a (and the other paired first and second connectors), the electrical connections are permutated so that each terminal m of the second connector is connected to the $m^{th}+4$ terminal of the first connector. (The designation of particular connectors as "first" or "second" connectors is, of course, arbitrary and for purposes of illustration only). For example, data input/output through data connector 140c (D7) proceeds through terminals m=1, 2, 3, and 4 of connectors 130c and 132a. However, between connector 132a and connector 130a, wires 134a are configured to connect the $m^{th}$ terminal of connector 132a to the $m^{th}+4$ terminal of connector 130a, so that the m=1 terminal of connector 132a is connected to the m=5 terminal of connector 130a, the m=2 terminal of connector 132a is connected to the m=6 terminal of connector 130a, and so on for all m.

The wiring arrangement for voice communication through phone connectors P1-P11 is similar to that for data transfer through connectors D1-D11. Voice communications are input/output from each workstation through phone connectors 142b (P6), 142a (P7), 142f (P1), 142g (P11), and the remaining phone connectors P2-P5, P8-P10 (not shown). Connecting wires 143a, 143b, 143f, and 143g extend from their respective phone connectors to the m=45, 46, 47, and 48 terminals of second connectors 132a, 132b, 132f, and 132g, respectively. These terminals electrically contact the correspondingly numbered terminals of first connectors 130c, 130a, 130d, and 130e, respectively. As noted above, between first connector 130a and second connector 132a the electrical connections are permutated so that each terminal m of the first connectors is connected to the $m^{th}-4$ terminal of the second connectors. For example, voice communications input/output through phone connector 142b (P6) proceeds through terminals m=45, 46, 47, and 48 of connectors 132b and 130a. However, between connector 130a and connector 132a, wires 134a are configured to connect the $m^{th}$ terminal of connector 130a to the $m^{th}-4$ terminal of connector 132a, so that the m=48 terminal of connector 130a is connected to the m=44 terminal of connector 132a, the m=47 terminal of connector 130a is connected to the m=43 terminal of connector 132a, and so on for all m.

Each end of the serial "chain" of modular wiring assemblies is connected to a voice or data communication bus, as illustrated in FIG. 2. Voice bus 151 provides eleven 4-conductor voice communication channels which are connected to phone connectors P1-P11 through the modular assemblies, as illustrated. Data bus 153 similarly provides eleven 4-conductor data communication channels which are similarly connected to data connectors D1-D11. Due to the permutated connections between the first and second connectors of each modular wiring assembly, most of the wires in the assemblies closest to voice bus 151 are used for voice communication, while few are used for data communication. Similarly, most of the wires in the assemblies closest to data bus 153 are used for data communication, while only a few are used for voice communication. For example, 44 of the 48 wires connecting "second" connector 132g and its associated "first" connector (not shown) are used for voice or phone communications, while only 4 wires are used for data communications. In the adjacent modular wiring assembly (also not shown), 40 wires are used for voice communication, while 8 are used for data. Near the middle of the serial "chain" of wiring assemblies, approximately half of the wires are used for voice communications with the remaining half being used for data.

Addition or subtraction of workstations is easily accomplished because of the modular construction of wiring assembly 110. First and second connectors having more or fewer terminals may be used to connect more or fewer workstations, respectively.

Figure 3:
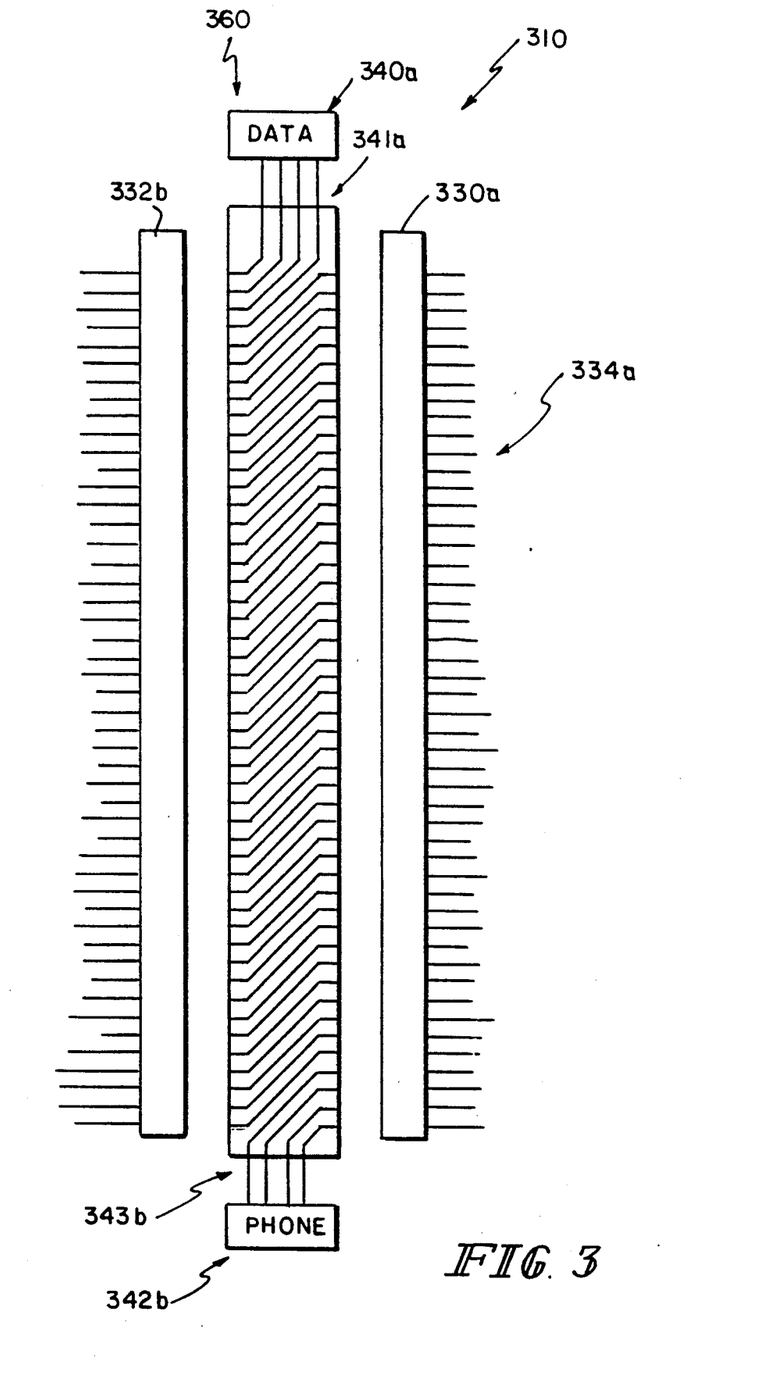
FIG. 3 is a diagrammatic view of a wiring arrangement in which a first connector of one modular assembly is electrically connected to a second connector of another assembly via an interconnection module.

FIG. 3 diagrammatically illustrates a portion of a wiring arrangement 310 capable of providing multiple modular workstations (not shown) with four terminal data and phone lines. The addition of the prefix "3" to corresponding numbers of components of the assembly shown in FIG. 1 and FIG. 2 is intended to connote the equivalence between those components and matching components illustrated in FIG. 3.

Wiring arrangement 310 provides a four-pin data communication channel 340a and a four-pin phone communication channel 342b to a workstation (not shown). As will be appreciated from the following description, a plurality of modules having a configuration identical or substantially identical to the illustrated arrangement can be interconnected to provide communications to a plurality of workstations.

As shown in FIG. 3, an interconnection module 360 is positioned to electrically connect a first connector 330a to a second connector 332b. The m terminals of first connector 330a are connected in one-to-one relation with m terminals of a second connector (not shown) which is substantially identical to second connector 332b. Similarly, the m terminals of second connector 332b are connected in one-to-one relation with the m terminals of a first connector (not shown) which is substantially identical to first connector 330a. The terminals of first and second connectors 330a and 332b are arbitrarily numbered so that m increases from the top to the bottom of the connectors. Terminals of interconnection module 360 are similarly numbered. As with the terminals described in FIG. 2, the numbering scheme is arbitrary and is preferably consistent for all connectors and interconnection modules.

Data is input/output from a workstation through data connector 340a. Connecting wires 341a extend from data connector 340a to the m=1, 2, 3, and 4 terminals of a first side of interconnection module 360 which faces second connector 332b. These terminals are respectively electrically connected to the corresponding m=1, 2, 3, and 4 terminals of second connector 332b. Connecting wires 343b extend from phone connector 342b to the m=45, 46, 47 and 48 terminals of a second side of interconnection module 360 which faces first connector 330a. Terminals 1-44 of the second side of interconnection module 360 are electrically connected to terminals 5-48 of the first side of module 360 so as to effect permutation of the type described in connection with FIG. 2. In other words, the interconnection module 360 is configured so that between first connector 330a and second connector 332b, the electrical connections are permutated so that each terminal m of first connector 330a is connected to the $m^{th}+4$ terminal of second connector 332b. Use of a plurality of such interconnection modules to connect a plurality of substantially identical modular wiring assemblies provides advantages like those described above in connection with the arrangement of FIG. 2.

Figure 4:
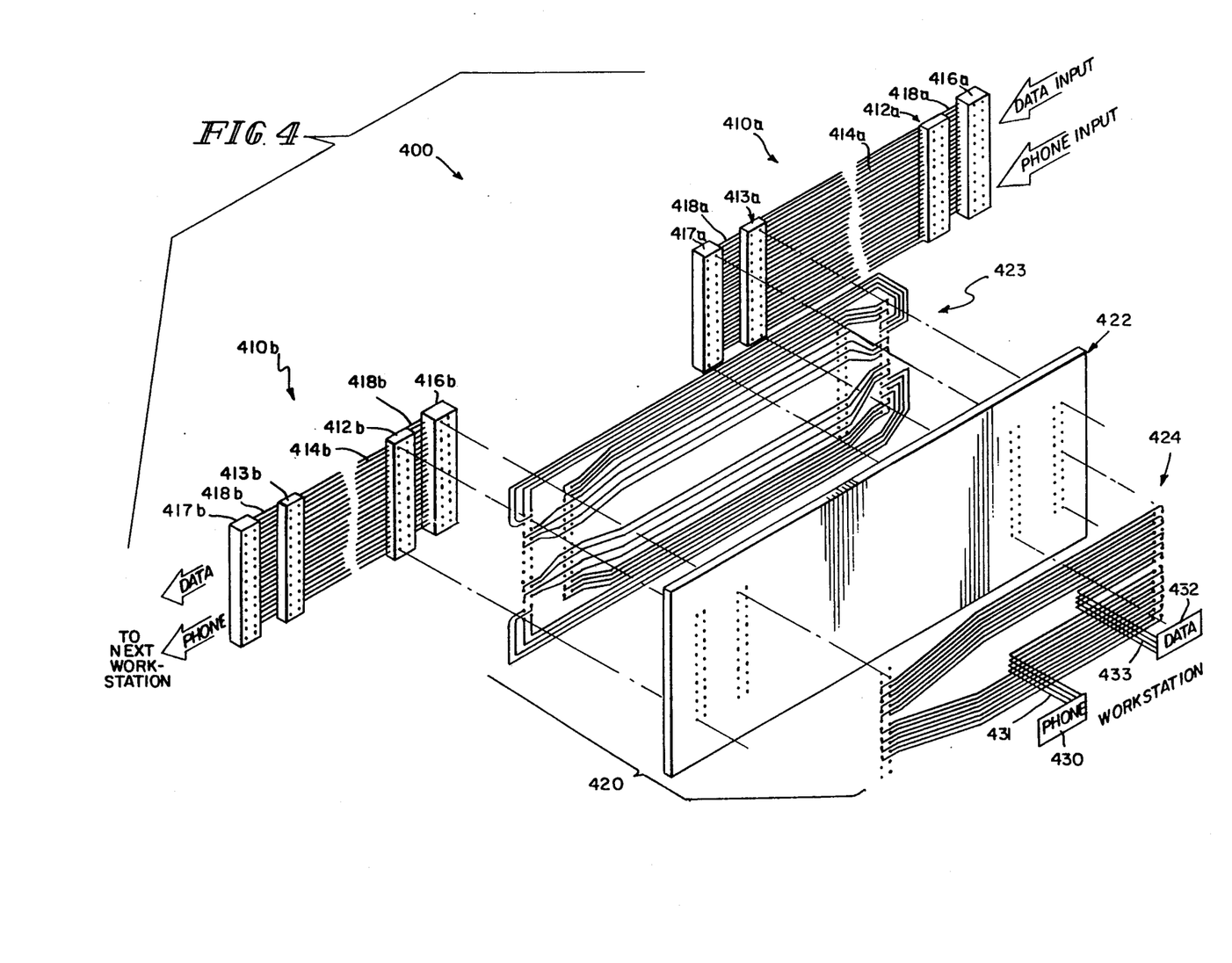
FIG. 4 is an exploded perspective view of a printed circuit board interconnection module.

FIG. 4 is an exploded perspective view of an alternative embodiment of the invention that, like the embodiment shown in FIG. 3, uses a plurality of identical modular wiring assemblies connected together with permutating interconnection modules. In this embodiment of the invention, a wiring arrangement 400 includes an interconnection module 420, having electrical conductors 423 and 424 etched or printed on a circuit board 422. The interconnection module 420 provides a permutated electrical interconnection between modular assemblies 410a and 410b.

Modular assemblies 410a and 410b are identically constructed, and all elements of modular assembly 410a have exact equivalents with corresponding elements in 410b. Module 410a has two separate wire arrays (414a and 418a) which respectively provide one-to-one electrical connection between terminals of connectors 412a-413a and 416a-417a, respectively. Data and phone channels carried by modular assembly 410a are connected to modular assembly 410b by electrical conductors 423 and 424 of interconnection module 420 such that the electrical connections between respective terminals of modular assemblies 410a and 410b are permutated in the manner described above. Phone connector 430 and data connector 432 are connected to module 420 by conductors 431 and 433, respectively. In operation, this embodiment of the invention works much like the embodiment of the invention illustrated in FIG. 3.

Figure 5:
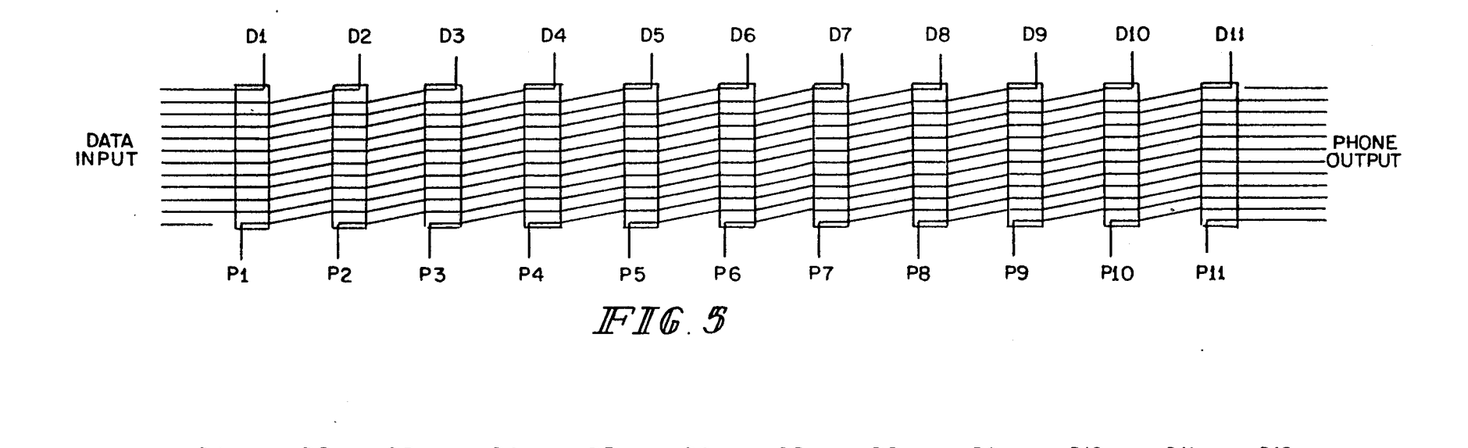
FIG. 5 shows a schematic representation of an embodiment of the wiring arrangement of the present invention as used to provide data and voice communication channels to a total of workstations.

FIG. 5 shows a schematic representation of an embodiment of the wiring arrangement of the present invention as used to provide data and voice communication channels to a total of 11 workstations. Each of the lines extending between the phone and data inputs and the data connectors (D1-D11) and phone connectors (P1-P11) represents a plurality of (e.g., two, four, etc.) individual conductors. Each of the paired rectangular blocks represent first and second m terminal connectors from adjacent wiring module assemblies matingly engaged at each of workstations 1-11. In this embodiment, the permutation described above is effected by connecting the $m^{th}$ terminal of one connector of each wiring module assembly to the $m^{th}+i$ terminal of the other connector, where i is a positive or negative integer. As noted above, each of the modular wiring assemblies is substantially identical and may be freely interchanged to connect various ones of the subject workstations.

Figure 6:
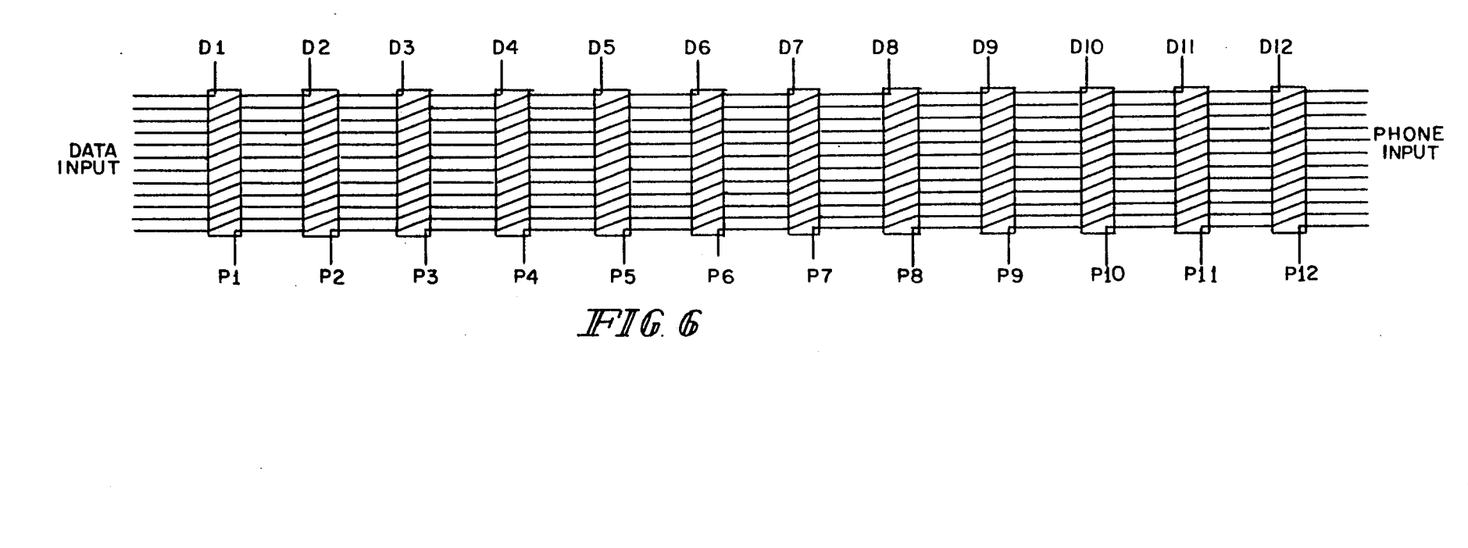
FIG. 6 shows a schematic representation of a wiring arrangement according to the present invention in which interconnection modules are used to provide data and voice communication channels to a total of 12 workstations.

FIG. 6 shows a schematic representation of a wiring arrangement according to the present invention in which interconnection modules are provided at each workstation, and are serially connected to one another by a plurality of wiring assemblies, each comprising two multi-terminal plugs connected together by a cable in one-to-one correspondence. As in the assembly of FIG. 5, each of the heavy lines in FIG. 6 represents a plurality (e.g., two, four, etc.) of electrical conductors. In the arrangement of FIG. 6, the permutation described above is effected by the interconnection module. Using four-terminal data and voice communication connectors, a total of 12 workstations can be provided with both voice and data connectors using a cable which has 48 individual conductors, as illustrated.

Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A wiring arrangement for providing communication channels to a plurality of workstations, the wiring arrangement comprising a plurality of communication connectors, each having respectively n terminals, at each of the plurality of workstations;

a plurality of modular assemblies comprising first and second connectors, each having m connection terminals, with the $m^{th}$ terminal of the first connector being electrically connected to the $m^{th}+i$ terminal of the second connector, where i is an integer, said modular assemblies being serially arranged whereby a first connector of one assembly matingly engages a second connector of an adjacent assembly at each of said workstations; and means for connecting the terminals of the first and second connectors on respective first and second free ends of said serially arranged assemblies to communication channels;

wherein each of the n terminals of the communication connectors is connected to an $m^{th}$ terminal of the first and second connectors at the workstations to provide each of the plurality of workstations access to the communication channels.

2. The wiring arrangement of claim 1, wherein said means for connecting the terminals of the connectors to communication channels comprises means for connecting the terminals of the first connector on the first free end of the serially arranged assemblies to a plurality of data communication channels, and means for connecting the terminals of the second conductor on the second free end of the assemblies to a plurality of voice communication channels.

3. The wiring arrangement of claim 1, wherein one of the plurality of communication connectors at each workstation is configured to provide an input/output data channel, and wherein another of the communication connectors is configured to provide an input/output voice channel.

4. The wiring arrangement of claim 3, wherein the communication connectors are provided with n=4 terminals, and wherein the integer is equal to four.

5. The wiring arrangement of claim 4, wherein N pairs of first and second connectors are serially arranged between said means for connecting the terminals to communication channels to provide workstations with voice and data communication channels, and wherein the number of connection terminals m is greater than or equal to 4N.

6. A wiring arrangement for providing data and phone communication channels to a plurality of workstations, the wiring arrangement comprising:

data and phone connectors having respectively n terminals at each of the plurality of workstations, a plurality of modular wiring assemblies, each comprising a first connector and a second connector, each connector having respectively m terminals interconnected by a plurality of wires, with the $m^{th}$ terminal of the first connector being connected to the $m^{th}+i$ terminal of the second connector, said plurality of wiring assemblies being serially arranged such that a first connector from one assembly matingly engages a second connector of an adjacent assembly at each workstation, and means for connecting the terminals of a first connector on a first free end of the serially arranged assemblies to a plurality of data channels, and means for connecting the terminals of a second connector on a second free end of the assemblies to a plurality of phone channels, wherein the n terminals of the data connector are connected to terminals of the first connector and the n terminals of the phone connector are connected to terminals of the second connector at each workstation to allow each of the plurality of workstations access to the data and phone communication channels.

7. A wiring arrangement for providing a plurality of workstations N with data and voice communication channels through a plurality of serially connected modular assemblies, each modular assembly comprising:

first and second connectors, each connector having m terminals;

means for connecting the terminals of the first connector to the terminals of the second connector such that the $m^{th}$ terminal of the first connector is connected to the $m^{th}+i$ terminal of the second connector, where i is an integer;

a data connector having a plurality of terminals connected to a first subset of terminals of the first or second connector; and a phone connector having a plurality of terminals connected to a second subset of terminals of the first or second connector.

8. The wiring arrangement of claim 7, wherein i is equal to the number of terminals contained in each of said first and second subsets of terminals.

9. A wiring arrangement for providing communication channels to a plurality of workstations, the wiring arrangement comprising:

multiple communication connectors having respectively n terminals at each of the plurality of workstations;

a plurality of serially arranged wiring assemblies, each having paired first and second connectors having respectively m connection terminals, with the $m^{th}$ terminal of the first connector connected to the $m^{th}$ terminal of the second connector;

means for connecting the m terminals of the first and second connectors on respective first and second free ends of the serially arranged assemblies to a plurality of communication channels; and a plurality of interconnection modules disposed between the first and second connectors of adjacent wiring assemblies and between the multiple communication connectors and the first and second connectors, each interconnection module connecting the $m^{th}$ connection terminal of the first connector to the $m^{th}+i$ connection terminal of the second connector of the adjacent assembly, where i is an integer, and connecting the n terminals of the communication connectors to a subset of terminals of the first or second connectors, so as to allow each of the plurality of workstations to be addressed through the multiple communication connectors.

10. The wiring arrangement of claim 9, wherein each interconnection module comprises a printed circuit board.

11. The wiring arrangement of claim 9, wherein said means for connecting the terminals of the first connector on the first free end comprises a second connector, having terminals connected to a plurality of data communication channels, and wherein said means for connecting the terminals of the second connector on the second free end comprises a first connector having terminals connected to a plurality of voice communication channels.

12. The wiring arrangement of claim 11, wherein said first and second connectors of said means for connecting are disposed at the first and $n^{th}$ workstations, respectively, and wherein and interconnection module is provided to connect these connectors to the serial arrangement of wiring assemblies.

13. The wiring arrangement of claim 9, wherein one of the multiple communication connectors is configured to carry an input/output data channel, and wherein another of the multiple communication connectors is configured to carry an input/output voice channel.

14. The wiring arrangement of claim 13 wherein the communication connector carrying the data channel and the communication connector carrying the voice channel have n=4 terminals, and wherein the integer i is equal to four.

15. The wiring arrangement of claim 14, wherein N−1 pairs of first and second connectors are arranged to provide N workstations with voice and data channels, and wherein the number of connection terminals m is greater than or equal to 4N.

16. A wiring arrangement for providing voice and data communication channels to each of a plurality of workstations, comprising:

a plurality of wiring assemblies, each comprising first and second m-terminal connectors and wiring means for connecting an $m^{th}$ terminal of the first connector to an $m^{th}+i$ terminal of the second connector, said plurality of wiring assemblies being serially arranged such that the first m-terminal connector of one assembly matingly engages the second m-terminal connector of an adjacent assembly at each workstation;

means for connecting a first free end of said serial arrangement of wiring assemblies to a plurality of voice communication channels;

means for connecting a second free end of said serial arrangement of wiring assemblies to a plurality of data communication channels; and a plurality of voice communication connectors, each having n terminals connected to selected terminals of each of said first m-terminal connectors, and a plurality of data communication connectors, each having q terminals connected to selected terminals of said second m-terminal connectors, so as to provide access to respective ones of said pluralities of voice and data communication channels at each of said plurality of workstations.

17. A wiring arrangement according to claim 16, wherein i=n=q.

18. A wiring arrangement according to claim 16, wherein voice and data communication channels are provided to N workstations by N−1 wiring assemblies serially connected so as to provide a voice communication connector and a data communication connector at each workstation at which a first connector of one assembly matingly engages a second connector of an adjacent assembly, and wherein said means for connecting the first free end of the serial arrangement of wiring assemblies to the plurality of voice communication channels comprises a second m-terminal connector for matingly engaging the first connector on the first free end of the serial arrangement of wiring assemblies, and wherein said means for connecting the second free end to the plurality of data communication channels comprises a first m-terminal connector for matingly engaging the second connector on the second free end of the serial arrangement, and wherein said second and first connectors of said connecting means are provided with data and voice communication connectors, respectively, so as to provide a data connector and a voice connector at each of said N workstations.

* * * * *